Feb. 13, 1962  W. HAKKARINEN  3,020,963
CUP ANEMOMETER

Filed April 9, 1958  2 Sheets-Sheet 1

INVENTOR
WILLIAM HAKKARINEN

BY *R. J. Tompkins*
ATTORNEY.

Feb. 13, 1962 W. HAKKARINEN 3,020,963
CUP ANEMOMETER
Filed April 9, 1958 2 Sheets-Sheet 2

INVENTOR
WILLIAM HAKKARINEN

BY *R. J. Tompkins*
ATTORNEY

United States Patent Office 3,020,963
Patented Feb. 13, 1962

3,020,963
CUP ANEMOMETER
William Hakkarinen, Hyattsville, Md., assignor to the United States of America as represented by the Secretary of the Navy
Filed Apr. 9, 1958, Ser. No. 727,507
4 Claims. (Cl. 170—36)
(Granted under Title 35, U.S. Code (1952), sec. 266)

The invention described herein may be manufactured and used by or for the Government of the United States of America for governmental purposes without the payment of any royalties thereon or therefor.

This invention relates to anemometers with special relation to cup anemometers usable under conditions of high stress, as in hurricane weather.

In the detection and tracking of hurricanes, special problems in anemometers have arisen due not only to the heavy stresses imposed by hurricane winds but also to likelihood of damage to the instrument at installation of the weather station. Station installation is by way of ship, submarine or parachute from aircraft, and in any case the basic requirement of rugged, shock resistant structure is present.

In the type of anemometer commonly in use, the thin-walled metal cups are attached to and around a common shaft by means of radial arms. Each arm penetrates diametrically the rim of a single cup, the cup being turned laterally with the rim edge being vertical and opening to the closed side of the next adjacent cup. Under the severe conditions to which the anemometer is subjected, the cups tend to twist on the rim supports, thus destroying the usefulness of the apparatus.

A primary object of the invention is to provide anemometer structure of such strength as to withstand the twisting torque of hurricane winds while maintaining normal accuracy of wind speed measurement. An object, also, is to provide an anemometer construction which will permit accurate observations of wind velocity from 5 to over 120 knots.

Other objects and many of the attendant advantages of this invention will be readily appreciated as the same becomes better understood by reference to the following detailed description when considered in connection with the accompanying drawings wherein.

Figure 1:
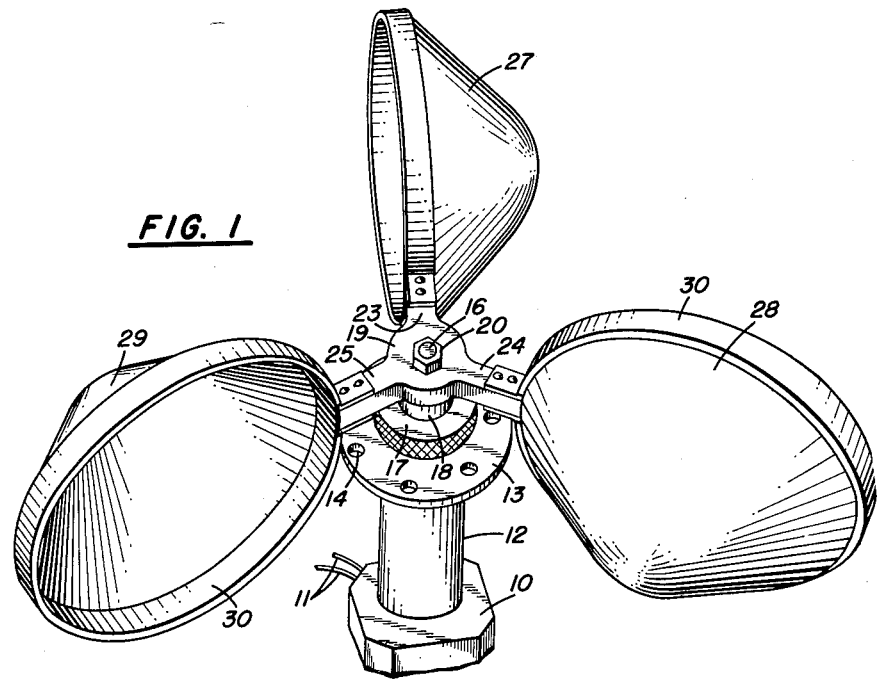
FIG. 1 is a view in perspective of a simplified form of the invention.

Referring now to FIG. 1 there is shown a base member 10 above which extends a tubular housing 12 which is capped by the flange 13, attachment openings 14 being shown in the flange. The shaft 16 extends upwardly through housing 12, knurled centering ring 17, spacing ring 18 and three-armed spider plate 19, these elements being attached together and to the shaft by means of shaft nut 20. As appears from FIG. 1, the arms 23, 24, and 25 of spider plate 19 are symmetrically positioned about the plate periphery at angles of 120 degrees, the arms being of rectangular section with their upper and lower surfaces coplanar with the spider plate surfaces.

Figure 4:
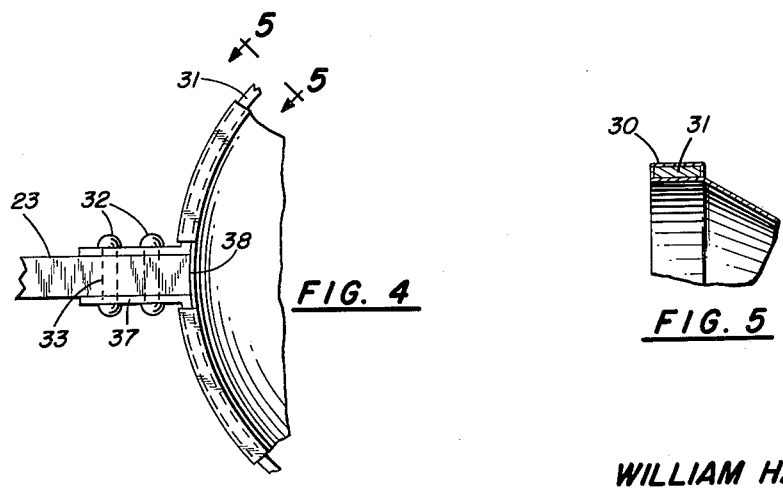
FIG. 4 is a detailed section illustrating the mode of cup rim attachment.
Figure 5:
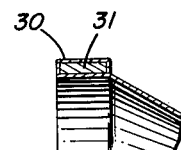
FIG. 5 is a section of the cup rim taken along line 5—5 of FIG. 4.

The anemometer cups 27, 28, and 29 are of identical construction, each being of shallow depth and formed of light, thin-walled metal, as aluminum, by a process of deep drawing, using special dies to maintain uniform thickness and strength in the cup wall. Each cup is broadly conical in shape with the free edge cylindrical and turned back outwardly to form a rim 30 with the turned section enclosing a relatively strong and heavier rim reinforcement band or strip 31 extending around the curved edge and having free band ends 37 turned outwardly and attached, as by rivets 32, to one of the projecting spider arms, 23, 24, or 25. Holes 33 are placed in the arm ends for this attachment and a section of the lip is cut away at 38 to permit out turning of the band ends 37. It thus appears that the cups are attached to the spider arms, not by the thin-walled cup structure but by the heavier and stronger band enclosing the cup rim, the rim lip being closely and positively attached to this band by folding the lip over and behind the band, as shown in FIG. 5. In this connection, it is observed that the cup band 31 covers a substantial area of the cup edge and that, in application, the strip is clamped under pressure, so that a rigid connection is made to the cup. Also, since as shown particularly in FIG. 4, the band ends, projecting outwardly and abutting the lip walls in cut-out section 38, serve to prevent end slippage of the band on the rim.

For many uses, the construction of the anemometer, as above described and shown in FIG. 1, is adequate, particularly where the cup sizes are small as with two inches diameter at the rim. However, where extreme stresses are anticipated or cup anemometers up to six inches are used, it may be desirable to employ the structure of FIG. 2 not only to add general rigidity to the structure but also to afford effective resistance to torsional movements of the cup due to angular wind blasts. This structure includes that of the FIG. 1 form, but in addition utilizes reinforcing rings 34 and 35. Each of these rings consists of a radially flat, rigid, metal, circular, strip of a diameter such that, when placed concentrically of the shaft 16 and above and in contact with the three anemometer cup edges, the contact point is approximately at the intersection of the rim with a vertical line drawn through the center of the rim circle. At this point, above and below each cup, a ring is fixedly attached, as by rivets penetrating openings through the cup rim and support band, thus providing a rigid three-point attachment for each cup, strongly resistant not only to direct head-on stresses but also to any torsional forces which may develop in use.

Figure 2:
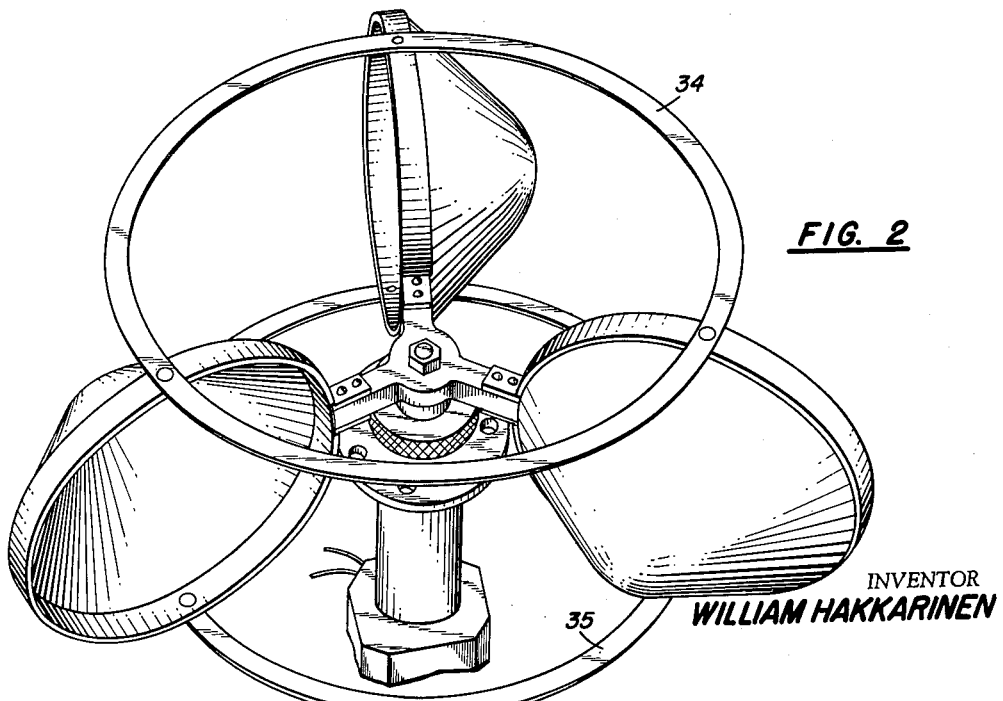
FIG. 2 is a view similar to FIG. 1 but with supporting structural elements added.
Figure 3:
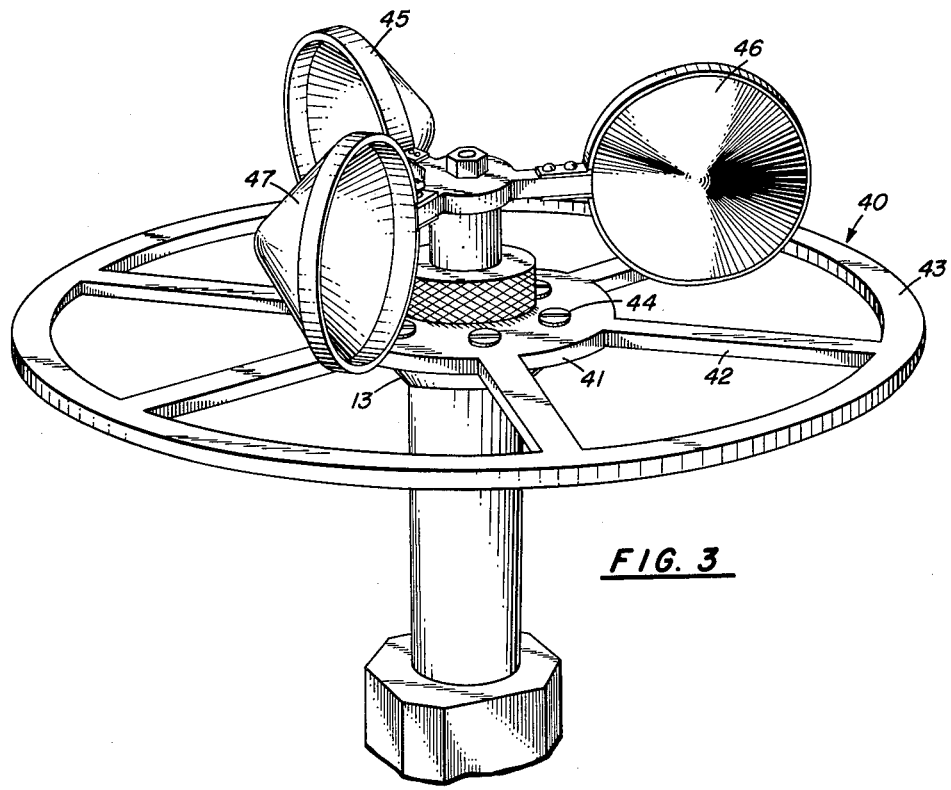
FIG. 3 is a perspective view of a modification of the invention.

The modified structure of FIG. 3 is applicable to both the small and large diameter cup arrangements of FIGS. 1 and 2, but has special utility in connection with the FIG. 1 structure where there is no supplementary support for the anemometer cups. On reference to FIG. 3 it will be seen that the flange 13, as also shown in FIG. 1, is here utilized to support a guard structure which takes the form of a guard ring 40. This guard ring includes a circular central hub section 41 having plural radiating spokes 42 and a peripheral rim 43, the hub being attached to the flange 13, as by screws 44, and the rim being displaced appreciably beyond the radial limits of the cups 45, 46, and 47. In use, the guard ring protects the cups from accidental damage during installation of weather stations, particularly of the floating type. It is pointed out that under storm conditions, a protective guard should not shield the cups from direct air flow and hence a solid disk type guard would distort the meter readings. Calibrations of the instrument, as described, with the open work guard ring arrangement, shows that the accuracy is not significantly affected by tipping the axis of cup rotation as much as 45 degrees from the vertical, under air flow conditions varying from 5 to over 20 knots.

In operation of the apparatus an indication of wind velocity may be obtained by any of several methods, none of which are important to the present concept which is directed to the cup structure of the anemometer. By way of illustration only, it is understood that a small generator, or even a selsyn, may be incorporated within the tubular housing 12 or base 10 and connected to shaft 16. The output of the generator is then connected by means of leads 11 to a suitable indicating instrument (not shown) calibrated in knots, or miles per hour. Through this arrangement the cups rotate in the wind, producing in leads 11 a potential proportional to the speed of rotation, this potential being read directly in knots or miles per hour on the indicating instrument.

Obviously many modifications and variations of the present invention are possible in the light of the above teachings. It is therefore to be understood that within the scope of the appended claims the invention may be practiced otherwise than as specifically described.

What is claimed is:

1. An anemometer, comprising a base, a support member mounted on said base, a shaft vertically mounted on said support member, a spider fixedly secured to the uppermost end of said shaft, a plurality of radial arms projecting from said spider, each of said arms being substantially rectangular in cross section and having a flat upper and lower face, a securing band fixedly secured to each of said radial arms, a plurality of cups of annular cross section having an open end and a closed end, said open end of said cups being formed with an outer bounding rim of rectangular cross section, said bounding rim being capable of receiving said securing band of rectangular cross section, each of said securing bands having one end attached to said upper face of said radial arm and the other end attached to said lower face of said radial arm with the open side of each cup lying in a plane parallel to said shaft and facing the closed side of an adjacent cup whereby said cup in cooperation with said securing band and said radial arm is prevented from rotating about the axis of said radial arm.

2. The anemometer as defined in claim 1 and additional means for preventing twisting movements of said cups.

3. The anemometer as defined in claim 2, said cup twist preventing means comprising at least one ring and means for attaching said ring to each of said cups.

4. The anemometer as defined in claim 2, said cup twist preventing means comprising two rigid rings, one below and one above said cups, with each ring being concentric of said shaft, and means for securing each ring to said cups.

References Cited in the file of this patent

UNITED STATES PATENTS

| | | |
|---|---|---|
| 515,674 | Gauldhaug | Feb. 27, 1894 |
| 691,082 | Thompson | Jan. 14, 1902 |
| 1,550,124 | Thompson | Aug. 18, 1925 |
| 2,549,282 | Aschbrenner | Apr. 17, 1951 |

FOREIGN PATENTS

| | | |
|---|---|---|
| 123,489 | Austria | June 25, 1931 |